United States Patent
Pai et al.

(10) Patent No.: US 11,665,774 B2
(45) Date of Patent: May 30, 2023

(54) MULTIPLE MODE PUSH-TO-X GROUP CALLS ON LONG TERM EVOLUTION NETWORKS

(71) Applicant: MOTOROLA SOLUTIONS, INC., Chicago, IL (US)

(72) Inventors: Madhusudan Pai, Frisco, TX (US); Basem A. Ardah, Plano, TX (US); Bibhudatta Biswal, Richardson, TX (US); Abhishek Jain, Irving, TX (US); Ramu Kandula, Mckinney, TX (US); Harisha Negalaguli, Mckinney, TX (US); Krishnakant Patel, Richardson, TX (US); Brahmananda R. Vempati, Dallas, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 33 days.

(21) Appl. No.: 17/341,031

(22) Filed: Jun. 7, 2021

(65) Prior Publication Data
US 2021/0297820 A1    Sep. 23, 2021

Related U.S. Application Data

(62) Division of application No. 16/730,057, filed on Dec. 30, 2019, now Pat. No. 11,083,042.

(51) Int. Cl.
*H04W 4/10*    (2009.01)
*H04W 76/45*    (2018.01)
(Continued)

(52) U.S. Cl.
CPC .............. *H04W 76/45* (2018.02); *H04W 4/10* (2013.01); *H04W 4/12* (2013.01); *H04W 84/042* (2013.01)

(58) Field of Classification Search
CPC ........... H04W 4/08; H04W 4/10; H04W 4/12; H04W 72/005; H04W 76/45; H04W 84/042
(Continued)

(56) References Cited

U.S. PATENT DOCUMENTS 5,801,969 A    9/1998 Nagahama
7,130,651 B2    10/2006 El-Fishawy
(Continued)

FOREIGN PATENT DOCUMENTS

AU    2017204160 A1    2/2018
WO    2014066139 A1    5/2014

OTHER PUBLICATIONS

International Search Report and Written Opinion for Application No. PCT/US2020/063948 dated Feb. 23, 2021 (16 pages).

*Primary Examiner* — Tan H Trinh
(74) *Attorney, Agent, or Firm* — Michael Best & Friedrich LLP

(57) ABSTRACT

Systems and methods for multiple mode push-to-x group calls. One example embodiment provides a push-to-X server. The push-to-X server includes a communication interface communicatively coupled to a communication network and an electronic processor. The electronic processor receives, via a unicast uplink channel, a group call request from a first subscriber unit of the communication network. The electronic processor receives, from the first subscriber unit, a push-to-X data stream. The electronic processor receives a unicast channel request from a second subscriber unit of the communication network. In response to receiving the unicast channel request, the electronic processor establishes a unicast channel resource with the second subscriber unit. The electronic processor transmits the push-to-X data stream to the second subscriber unit via (Continued)

the unicast channel resource and transmits the push-to-X data stream to a plurality of subscriber units via a broadcast media bearer channel.

6 Claims, 4 Drawing Sheets

(51) Int. Cl.
*H04W 4/12* (2009.01)
*H04W 84/04* (2009.01)

(58) Field of Classification Search
USPC ............... 455/518, 519, 423; 370/259, 312; 709/214, 217
See application file for complete search history.

(56) References Cited

U.S. PATENT DOCUMENTS

| | | | |
|---|---|---|---|
| 8,509,788 B2 | 8/2013 | Natarajan et al. | |
| 9,473,906 B2 | 10/2016 | Yu et al. | |
| 2005/0032538 A1* | 2/2005 | Noel | H04W 76/45 455/518 |
| 2005/0032539 A1* | 2/2005 | Noel | H04W 72/10 455/518 |
| 2006/0030344 A1 | 2/2006 | Lim | |
| 2006/0073843 A1 | 4/2006 | Aerrabotu et al. | |
| 2006/0211455 A1 | 9/2006 | Choi | |
| 2006/0271636 A1* | 11/2006 | Balasuriya | H04L 65/4061 709/217 |
| 2007/0021133 A1 | 1/2007 | Coulas | |
| 2007/0049314 A1* | 3/2007 | Balachandran | H04W 52/50 455/518 |
| 2007/0168523 A1 | 7/2007 | Jiang et al. | |
| 2007/0281722 A1 | 12/2007 | Gao | |
| 2008/0112431 A1 | 5/2008 | Jagadesan et al. | |
| 2009/0061904 A1 | 3/2009 | Emrich et al. | |
| 2009/0245157 A1 | 10/2009 | Song | |
| 2010/0226286 A1* | 9/2010 | Rossotto | H04L 61/5084 370/259 |
| 2012/0033623 A1* | 2/2012 | Chu | H04W 76/10 455/518 |
| 2012/0172028 A1 | 7/2012 | Korus et al. | |
| 2013/0110921 A1* | 5/2013 | Logan | H04N 21/6405 709/204 |
| 2014/0100961 A1* | 4/2014 | Lee | G06Q 30/0267 705/14.64 |
| 2014/0112242 A1 | 4/2014 | Vilmur et al. | |
| 2014/0119267 A1 | 5/2014 | Santhanam et al. | |
| 2014/0242978 A1* | 8/2014 | Shuman | H04W 76/18 455/423 |
| 2014/0274080 A1 | 9/2014 | Gilbert et al. | |
| 2014/0355508 A1* | 12/2014 | Anchan | H04W 76/40 370/312 |
| 2015/0039691 A1 | 2/2015 | Sharma et al. | |
| 2015/0172875 A1 | 6/2015 | Lin et al. | |
| 2016/0119762 A1 | 4/2016 | Zhu et al. | |
| 2017/0237790 A1 | 8/2017 | Patel et al. | |
| 2017/0289776 A1* | 10/2017 | Kim | H04W 4/10 |
| 2018/0160278 A1 | 6/2018 | Patel et al. | |
| 2018/0249302 A1 | 8/2018 | Pai | |
| 2019/0238352 A1 | 8/2019 | Ge et al. | |
| 2019/0239032 A1 | 8/2019 | Balasubramanian et al. | |

\* cited by examiner

MULTIPLE MODE PUSH-TO-X GROUP CALLS ON LONG TERM EVOLUTION NETWORKS

CROSS-REFERENCE TO RELATED APPLICATIONS

This application is a divisional of U.S. patent application Ser. No. 16/730,057, filed Dec. 30, 2019, the entire contents of which are hereby incorporated by reference.

BACKGROUND OF THE INVENTION

Public safety and other organizations use communication networks and portable electronic devices (for example, portable two-way radios, smart telephones, etc.) to facilitate communication among their members. Some of these devices provide push-to-talk (PTT) functionality. PTT is a method of transmitting audio communications over in a half-duplex communication modality (for example, as described in the Third Generation Partnership Project (3GPP™) Mission Critical PTT (MCPTT) standard). Some networks and devices operate using an expanded PTT protocol known as push-to-anything or push-to-X (PTX) communications. PTX combines voice (audio) and multimedia communications in a single PTT call and enables members to share videos, images, documents, and text messages with one another.

Some wireless communication networks support thousands of portable subscriber units. To streamline communication, organization members may be assigned to different communication groups (sometimes referred to as "talkgroups"). For example, to send a communication to a subgroup of members, a subscriber unit transmits a group call to an assigned talkgroup rather than sending a communication repeatedly to the individual members of the subgroup. Talkgroups may include hundreds or thousands of subscriber units.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
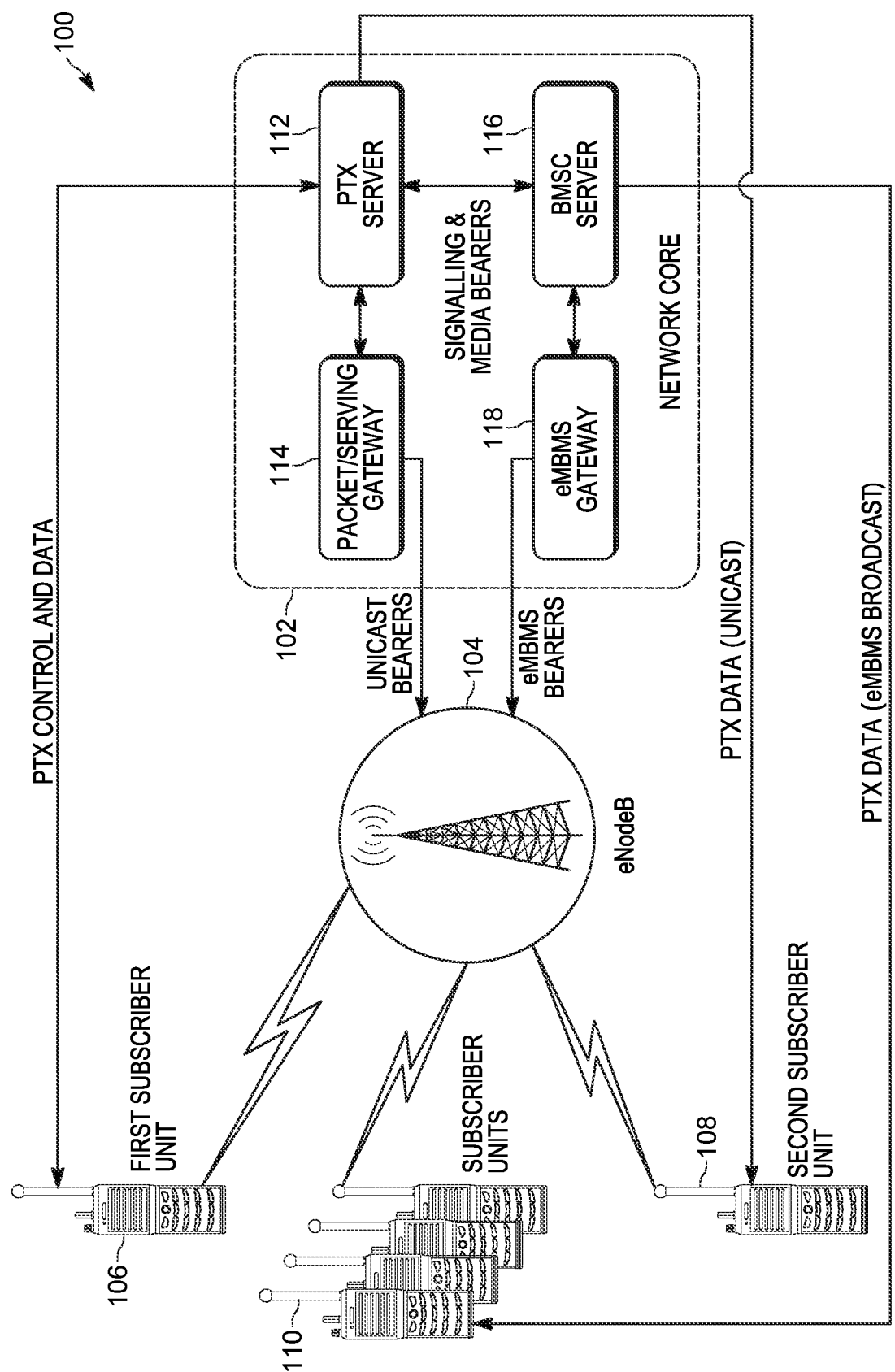
FIG. 1 is a diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Within Long Term Evolution (LTE™) and other wireless communication networks (including 5G networks), talkgroups are used to organize and streamline communications. Talkgroups provide virtual radio channels in digital radio systems for use by subsets of users of a communications network. Participants in a talkgroup are able to communicate with one another using PTX communications. Talkgroup communications are kept within the talkgroup and are not transmitted to others using the same communications network who are not participants in the talkgroup. For networks supporting large organizations, individual talkgroups may include thousands of participants.

For high volume talkgroups, placing group PTX calls using unicast replication for each talkgroup participant is prohibitively resource intensive. For example, the unicast packet replication places a heavy demand on the PTX server's CPU and the networks backhaul bandwidth resources. In addition, creation of the high volume of unicast bearers can overwhelm network resources and result in a message storm as all of the devices attempt to enter the connected state to receive the PTX data. To address these problems, some communications networks (for example, those operating according to the 3GPP™ MCPTT 24.379 (Signaling) and 24.380 (User Plane) standards) transmit PTT/PTX communications over enhanced Multimedia Broadcast Multicast Services (eMBMS) broadcast bearers.

However, in such networks, the eMBMS PTT group call setup (MapGroupToBearer message) requires a unicast notification sent from each eMBMS participant device back to the PTX server. This notification enables the PTX server to be aware of which eMBMS participants are listening to the eMBMS media bearer. This presents problems similar to unicast replication. For example, in LTE™ networks, receiving acknowledgements from large quantities of subscriber units may result in an RRC_Connected storm (excessive transmission of traffic) on the uplink and downlink radio channels at some eNodeBs. As a consequence, the number of subscriber units is limited to the maximum number of RRC_Connected subscriber units supported by an eNodeB, which can vary significantly based on the LTE™ channel frequencies available. The storm may also lead to end-to-end audio truncation because not all subscriber units can immediately receive audio sent over the eMBMS media bearer. These limitations may result in inefficient use of the overall communications network. For example, computing and bandwidth resources are wasted by the RRC_Connected storm and truncated communications may have to be re-sent or transmitted through other means. Accordingly, systems and methods are provided herein for, among other things, multiple mode PTX group calls on long term evolution and other wireless communication networks.

Among other things, the embodiments provided herein, rather than requiring positive acknowledgements for PTX group calls over eMBMS, utilize an eMBMS group call setup flow that retains listening subscriber units in an idle state (for example, an LTE™ RRC_IDLE). Because subscriber units do not first have to enter a connected state in order to receive PTX data, the number of possible eMBMS listeners for a PTX group call is increased. In the event that a subscriber unit is unable to receive audio/floor control over the broadcast media bearer for the group call, some embodiments also provide a negative acknowledgement as part of the group call setup flow. This allows the PTX server to transmit nearly simultaneously to subscriber units using both unicast and broadcast bearers. This, in turn, increases the overall total of group call participants able to receive the PTX communication. Unicast bearers are only established as needed to transmit or receive PTX communications. Unicast bearers are torn down when not needed (e.g. the floor is relinquished or broadcast bearers are available), enabling subscriber units to spend as much time as possible in the idle mode while still receiving PTX communications.

Among other things, using such embodiments, wireless communication networks achieve an increase in the number of eMBMS listeners for PTX group calls, leading to more efficient use of the communication network and its computing resources. In some embodiments, the number of listeners is only limited by the number of subscriber units attached to an eNodeB. Embodiments presented herein also lead to improved battery life for subscriber units, which do not have to transition from an idle state to a connected state in order to receive PTX communications.

One example embodiment provides a push-to-X server for a communications network. The push-to-X server includes a communication interface communicatively coupled to a communication network and an electronic processor, coupled to the communication interface. The electronic processor is configured to receive, via a unicast uplink channel, a group call request from a first subscriber unit of the communication network. The electronic processor is configured to receive, from the first subscriber unit, a push-to-X data stream. The electronic processor is configured to receive, via the communication interface, a unicast channel request from a second subscriber unit of the communication network. The electronic processor is configured to, in response to receiving the unicast channel request, establish, via the communication interface, a unicast channel resource with the second subscriber unit. The electronic processor is configured to transmit the push-to-X data stream to the second subscriber unit via the unicast channel resource. The electronic processor is configured to transmit the push-to-X data stream to a plurality of subscriber units via a broadcast media bearer channel.

Another example embodiment provides a method for operating a communications network. The method includes receiving a group call request from a first subscriber unit of the communication network via a unicast uplink channel. The method includes receiving, from the first subscriber unit, a push-to-X data stream. The method includes receiving, via a communication interface, a unicast channel request from a second subscriber unit of the communication network. The method includes, in response to receiving the unicast channel request, establishing, via the communication interface, a unicast channel resource for the second subscriber unit. The method includes transmitting the push-to-X data stream to the second subscriber unit via the unicast channel resource. The method includes transmitting the push-to-X data stream to a plurality of subscriber units via a broadcast media bearer channel without exchanging unicast messaging with any of the plurality of subscriber units.

Yet another example embodiment provides a portable communication device. The portable communication device includes a communication interface communicatively coupled to a communication network and an electronic processor, coupled to the communication interface. The electronic processor is configured to operate in an idle mode to receive a broadcast push-to-X data transmission from a push-to-X server via a broadcast media bearer channel without exchanging unicast messaging with the push-to-X server. The electronic processor is configured to determine a state for the broadcast media bearer channel. The electronic processor is configured to determine a state for a broadcast control bearer channel to the push-to-X server. The electronic processor is configured to, in response to determining that the state for both the broadcast media bearer channel and the broadcast control bearer channel is up, remain in the idle mode. The electronic processor is configured to, in response to determining that the state for either the broadcast media bearer channel or the broadcast control bearer channel is down, operate in a connected mode to receive the push-to-X data transmission from the push-to-X server via a unicast channel resource.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Furthermore, embodiments are described, by way of example, in terms of LTE™ networks. However, it should be noted that the systems and methods presented are applicable to any network technology (for example, 4G, 5G, and future-developed networks) capable of both unicast and broadcast transmission.

FIG. 1 is a diagram of one embodiment of a communications system 100. In the example illustrated, the system 100 is a communications network that includes a network core 102, an Evolved Node B (eNodeB) 104, a first subscriber unit 106, a second subscriber unit 108, and a plurality of other subscriber units 110. The first subscriber unit 106, the second subscriber unit 108, and the plurality of other subscriber units 110 are communicatively coupled via the network core 102 and the eNodeB 104. In some embodiments, the communications system 100 provides a long-term evolution (LTE™) cellular service to communication devices (for example, the first subscriber unit 106, the second subscriber unit 108, and the plurality of other subscriber units 110) within a broadcast area (for example, a 3GPP Service Area spanning one or more eNodeBs). In the illustrated embodiment, the network core 102 is an LTE™ Evolved Packet Core (EPC). The eNodeB 104 is a base station, which includes hardware and software components for communicating wirelessly with devices and network components. For example, in some embodiments, the network core 102 controls the eNodeB 104 to communicate with the first subscriber unit 106, the second subscriber unit 108, and the plurality of other subscriber units 110.

In the example illustrated, the network core 102 includes a push-to-X (PTX) server 112, a packet/serving gateway 114, a broadcast multicast service center (BMSC) server 116, and an enhanced Multimedia Broadcast Multicast Services (eMBMS) gateway 118. The network core 102 also includes other network components (not shown) for controlling the operation of the communications system 100 and routing traffic within and outside of the communications system 100. The network core 102 also includes network components (for example, a mobility management entity (MME)) for authenticating and attaching communication devices to the eNodeB 104.

In the embodiment illustrated, the communications system 100 operates to allow the subscriber units to communicate using talkgroups. As used in the present application, the term "talkgroup" refers to a virtual radio channel that is used for communication among a group of subscriber units. Each subscriber unit in a particular talkgroup is assigned a talkgroup identifier, which allows the subscriber unit to communicate with other subscriber units assigned the same talkgroup identifier. Subscriber units (and thus the users of the subscriber units) can be assigned to multiple talkgroups.

Figure 2:
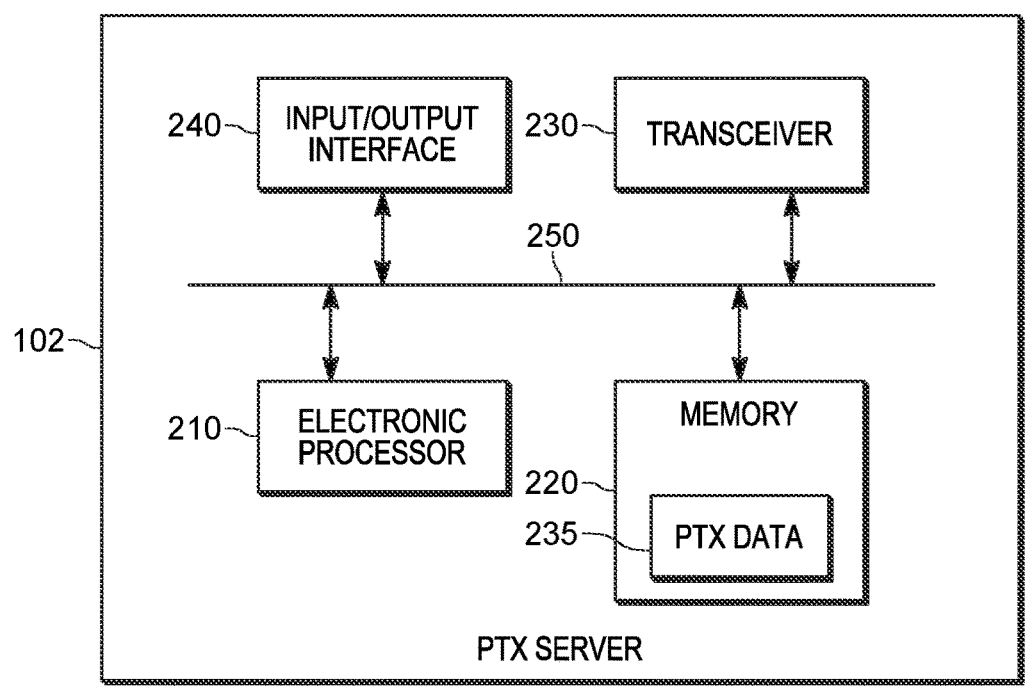
FIG. 2 is a block diagram of a push-to-X server of the communications system of FIG. 1 in accordance with some embodiments.

The push-to-X server 112, described more particularly herein with respect to FIG. 2, exchanges PTX control signals (for example, group call requests) and data (for example, voice, video, image, text, and documents) with the first subscriber unit 106, the second subscriber unit 108, and the plurality of subscriber units 110. PTX is an enhanced push-to-talk communications protocol that combines voice (audio) and multimedia communications in a single PTT call and enables subscriber units to transmit videos, images, documents, and text messages to one another using PTT communications. In some embodiments, the push-to-X server 112 controls push-to-X (including push-to-talk) communications on the system 100 according to the 3rd Generation Partnership Project Technical Specification 24.379. As described in detail herein, the push-to-X server 112 transmits PTT data (for example, received from the first subscriber unit 106) using unicast bearers (for example, via the packet/serving gateway 114 to the second subscriber unit 108), using eMBMS broadcast bearers (for example, via the BMSC server 116 and the eMBMS gateway 118 to the plurality of subscriber units 110), or both. Subscriber units wishing to communicate through the network core 102 using push-to-talk or push-to-X functionality register and deregister with push-to-X server 112 using unicast control channels. The push-to-X server 112 tracks the push-to-talk registrations and controls elements of the system 100 to establish push-to-talk communications sessions between subscriber units, as described herein.

In some embodiments, the push-to-X server 112 may be part of or controlled by central network equipment or a dispatch controller used by a public safety agency such as a fire department or police department. In other embodiments, the push-to-X server 112 may be any network equipment used by an agency, network administrator, or telecommunications provider.

The packet/serving gateway 114 includes hardware and software components configured to send and receive network packets to and from the first subscriber unit 106, the second subscriber unit 108, and the plurality of subscriber units 110 and the eNodeB 104. The packet/serving gateway 114 enables subscriber units to communicate with various components of the network core 102 (for example, the push-to-X server 112).

The BMSC server 116 includes hardware and software components for scheduling and transmission of broadcast content (for example, PTX data received from the push-to-X server 112).

The eMBMS gateway 118 includes hardware and software components configured to control broadcast flows between the network core 102 and the eNodeB 104. In some embodiments, the eMBMS gateway 118 is a standalone network element, as illustrated in FIG. 1. In some embodiments, the eMBMS gateway 118 may be physically co-located with the packet/serving gateway 114 or the BMSC server 116.

Each of the first subscriber unit 106 (described more particularly herein with respect to FIG. 3), the second subscriber unit 108, and the plurality of other subscriber units 110 is a portable communications device, and may be, for example, a mobile two-way radio, a smart telephone, a smart watch, a vehicle modem, a laptop computer, a tablet computer, or other similar device capable of operating as described herein.

FIG. 1 illustrates only one exemplary embodiment of the system 100. In other embodiments, the system 100 may include more or fewer components and may perform functions that are not explicitly described herein. In addition, although the network core 102 is illustrated as communicating with the subscriber units 106, 108, and 110 via a single eNodeB 104, the network core 102 may communicate with the subscriber units 106, 108, and 110 via multiple base stations and through other network cores. In addition, although the system 100 is shown as a centralized system, the system 100 may also be implemented as a decentralized system in which the functionality of the various components is accomplished within one or more of the subscriber units, or in other network infrastructure (not shown).

FIG. 2 schematically illustrates one embodiment of the push-to-X server 112. In the example illustrated, the push-to-X server 112 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one exemplary embodiment of a call push-to-X server 112. The push-to-X server 112 may include fewer or additional components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the push-to-X server 112 described herein. The memory 220 may include, for example, a program storage area and a data storage area. The program storage area and the data storage area may include combinations of different types of memory, such as read-only memory and random-access memory. In the embodiment illustrated, the memory 220 stores, among other things, PTX data 235 (for transmission to subscriber units as described herein).

The transceiver 230 enables wireless communication from the push-to-X server 112 to, for example, the subscriber units 106, 108, 110 via the packet/serving gateway 114 and the eNodeB 104. In other embodiments, rather than the transceiver 230, the push-to-X server 112 may include separate transmitting and receiving components, for example, a transmitter, and a receiver. In yet other embodiments, the push-to-X server 112 may not include a transceiver 230 and may communicate with the subscriber units 106, 108, 110 via a network interface and a wired connection to the network core 102.

The input/output interface 240 may include one or more input mechanisms (for example, a touch screen, a keypad, a button, a knob, and the like), one or more output mechanisms (for example, a display, a printer, a speaker, and the like), or a combination thereof. The input/output interface 240 receives input from input devices actuated by a user, and provides output to output devices with which the user interacts. In some embodiments, as an alternative or in addition to managing inputs and outputs through the input/output interface 240, the push-to-X server 112 may receive user input, provide user output, or both by communicating with an external device, such as a console computer, over a wired or wireless connection.

Figure 3:
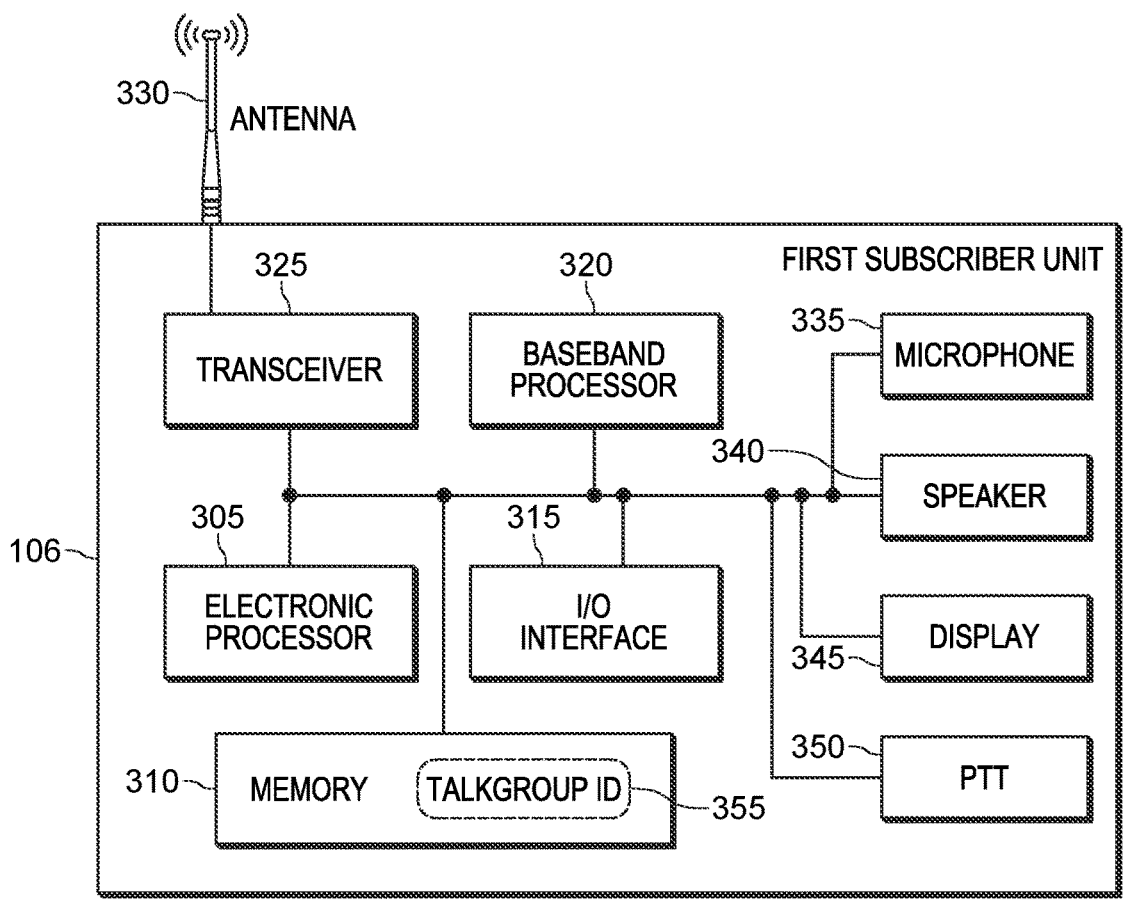
FIG. 3 is a block diagram of a subscriber unit of the communications system of FIG. 1 in accordance with some embodiments.

FIG. 3 schematically illustrates one embodiment of the first subscriber unit 106. In the embodiment illustrated, the first subscriber unit 106 includes an electronic processor 305, a memory 310, an input/output interface 315, a baseband processor 320, a transceiver 325, an antenna 330, microphone 335, a loudspeaker 340, and a human machine interface (including a display 345 and a push-to-talk (PTT) selection mechanism 350). The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the first subscriber unit 106 includes fewer or additional components in configurations different from that illustrated in FIG. 3.

The electronic processor 305 obtains and provides information (for example, from the memory 310 and/or the input/output interface 315), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the control processes and methods described herein. The memory 310 can include one or more non-transitory computer-readable media, and includes a program storage area and a data storage area. The program storage area and the data storage area can include combinations of different types of memory, as described herein. In the embodiment illustrated, the memory 310 stores, among other things, a talkgroup identifier 355 (indicating the subscriber unit's membership in a particular talkgroup).

The input/output interface 315 is configured to receive input and to provide system output. The input/output interface 315 obtains information and signals from, and provides information and signals to, (for example, over one or more wired and/or wireless connections) devices both internal and external to the first subscriber unit 106.

The electronic processor 305 is configured to control the baseband processor 320 and the transceiver 325 to transmit and receive radio frequency signals (for example, encoded with audio or other data) to and from the first subscriber unit 106. The baseband processor 320 encodes and decodes digital data (including digitized audio signals) sent and received by the transceiver 325. The transceiver 325 transmits and receives radio signals to and from, for example, the eNodeB 104 using the antenna 330. The electronic processor 305, the baseband processor 320, and the transceiver 325 may include various digital and analog components (for example, digital signal processors, high band filters, low band filters, and the like), which for brevity are not described herein and which may be implemented in hardware, software, or a combination of both. In some embodiments, the transceiver 325 is a combined transmitter-receiver component. In other embodiments, the transceiver 325 includes separate transmitter and receiver components.

The microphone 335 is a transducer capable of sensing sound, converting the sound to electrical signals, and transmitting the electrical signals to the electronic processor 305. The electronic processor 305 processes the electrical signals received from the microphone 335 to produce an audio signal, which may be transmitted to other devices via the transceiver 325. The loudspeaker 340 is a transducer for reproducing sound from electrical signals (for example, generated from a received audio signal) received from the electronic processor 305. In some embodiments, the microphone 335, the loudspeaker 340, or both may be integrated in a single housing with the other components (for example, in a portable hand-held radio, smart telephone, or converged device). In some embodiments, the microphone 335, the loudspeaker 340, or both are present in an accessory device (for example, a remote speaker microphone (RSM) or headset) connect via a wired or wireless connection to the first subscriber unit 106.

The display 345 is a suitable display, for example, a liquid crystal display (LCD) touch screen, or an organic light-emitting diode (OLED) touch screen. In some embodiments, the first subscriber unit 106 implements a graphical user interface (GUI) (for example, generated by the electronic processor 305, from instructions and data stored in the memory 310, and presented on the display 345), that enables a user to interact with the first subscriber unit 106.

The push-to-talk selection mechanism 350 allows a user of the first subscriber unit 106 to initiate push-to-talk (including PTX) communications to one or more other subscriber units (for example, via the push-to-X server 112). For example, when the electronic processor 305 detects that the push-to-talk selection mechanism 350 is enabled, the electronic processor 305 controls the transceiver 325 to transmit signals created by sound detected by the microphone 335 (for example, as a half-duplex communication signal). When the electronic processor 305 detects that the push-to-talk selection mechanism 350 is no longer enabled (for example, has been released), the transceiver 325 stops transmitting the signals. In some embodiments, the push-to-talk selection mechanism 350 is a mechanical button, key, switch, or knob. In some embodiments, the push-to-talk selection mechanism 350 is provided as part of a graphical user interface (for example, a virtual button) presented on the display 345.

In some embodiments, the first subscriber unit 106 communicates with one or more external devices that may be part of a personal area network (PAN) of devices. The one or more external devices may include, for example, a holster sensor, an environmental sensor, a biometric sensor, a body-mountable camera, and the like. The second subscriber unit 108 and each of the plurality of subscriber units 110 includes similar components as described above, and is configured similarly to the first subscriber unit 106.

Figure 4:
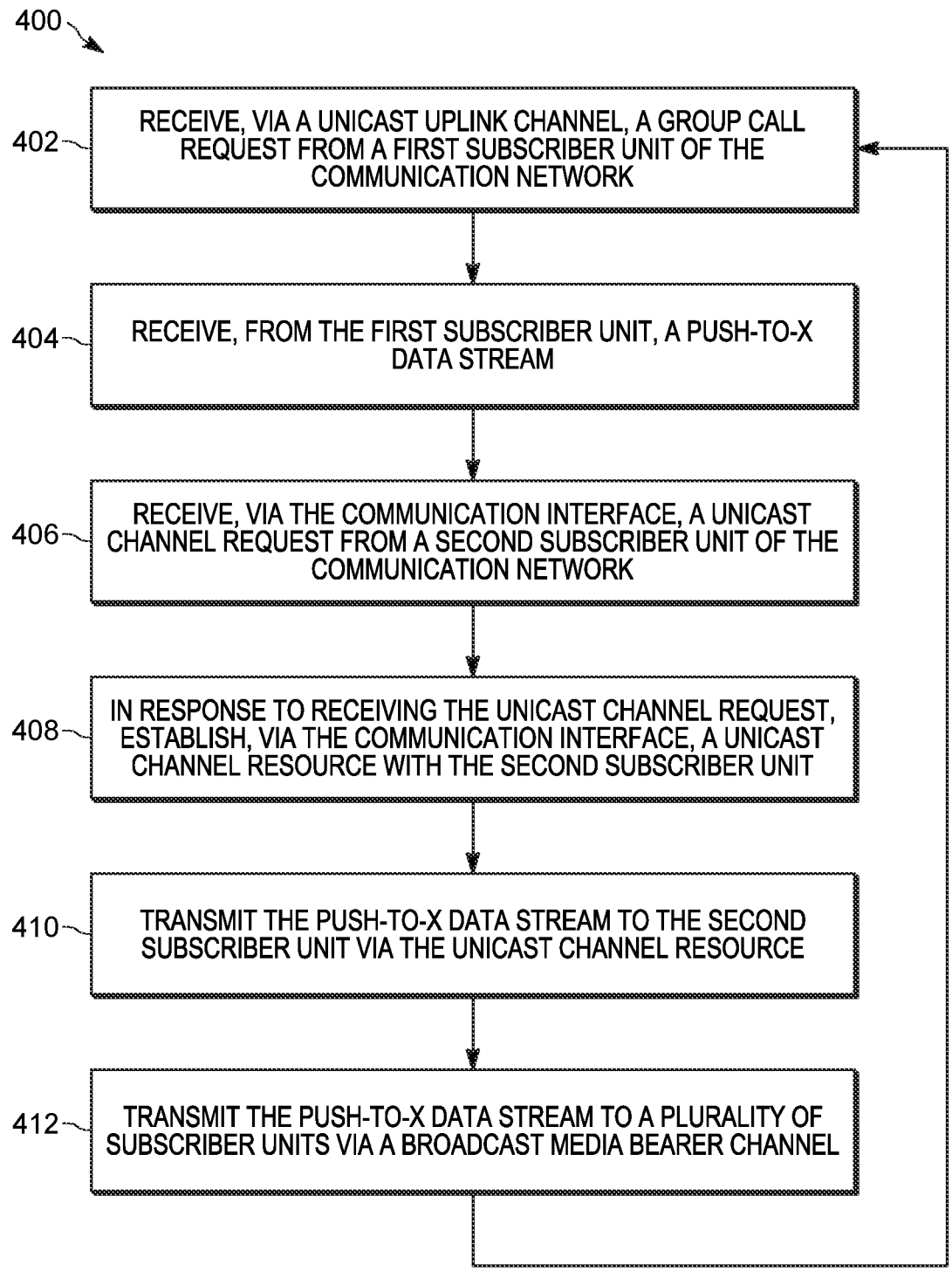
FIG. 4 is a flowchart illustrating a method for operating the push-to-X server of FIG. 2 in accordance with some embodiments.

As noted, group calls to very large talkgroups may result in unicast message storms, resulting in inefficient use of the subscriber units and the communications network. FIG. 4 illustrates an example method 400 for operating a communications system to provide for the combined broadcast and unicast transmission of PTX communications, which reduces the occurrence of unicast storms and increases the number of subscriber units successfully able to receive the PTX communications. Although the method 400 is described in conjunction with the system 100 as described herein, the method 400 could be used with other systems and devices. In addition, the method 400 may be modified or performed differently than the specific example provided.

As an example, the method 400 is described as being performed by the push-to-X server 112 and, in particular, the electronic processor 210. However, it should be understood that in some embodiments, portions of the method 400 may be performed by other devices, including for example, one or more of the subscriber units 106, 108, and 110, and the BMSC server 116. Additional electronic processors may also be included in the subscriber units 106 and/or call controller 102 that perform all or a portion of the method 400. For ease of description, the method 400 is described in terms of the first and second subscriber units 106, 108 and the plurality of subscriber units 110. However, the method 400 may be applied to enable PTX communications among hundreds or thousands of subscriber units.

At block 402, the electronic processor 210 receives a group call request from the first subscriber unit 106 of the communication network. For example, the push-to-X server 112 may receive, in response to a user-initiated PTX request at the first subscriber unit 106, a floor request message from the first subscriber unit 106 via a unicast uplink channel. In response, the push-to-X server 112 grants the floor (that is, establishes a call) to the first subscriber unit 106.

At block 404, the electronic processor 210 receives, from the first subscriber unit 106, a push-to-X data stream (for example, a push-to-talk audio stream).

As noted, subscriber units monitor over the air broadcast channels of the BMSC server and are able to remain in idle mode and still receive PTX communications. However, as described herein with respect to FIG. 5, subscriber units that are unable to communicate using either the broadcast media bearer or the broadcast control bearer may request unicast resources for PTX communications. For example, at block 406, the electronic processor 210 receives, via the communication interface, a unicast channel request from the second subscriber unit 108. For example, the push-to-X server 112 may receive a control plane message (for example, a session initiation protocol (SIP) REFER request, a SIP re-INVITE request, etc) or a user plane message (for example, a new media talk burst control protocol 'broadcast to unicast mode change request' RTCP message).

At block 408, in response to receiving the unicast channel request, the electronic processor 210 establishes, via a communication interface (for example, the transceiver 230), a unicast channel resource with the second subscriber unit 108. For example, the push-to-X server 112 may establish a long term evolution guaranteed bit rate bearer.

At block 410, the electronic processor 210 transmits (for example, via the packet/serving gateway 114 and the eNodeB 104) the push-to-X data stream to the second subscriber unit 108 via the unicast channel resource.

At block 412, the electronic processor 210 transmits (for example, via the eMBMS gateway 118 and the eNodeB 104) the push-to-X data stream to the plurality of subscriber units 110 via one or more broadcast media bearer channels (for example, an evolved multimedia broadcast multicast services media broadcast bearer channel). As noted, the PTX server transmits the push-to-X data stream to the plurality of subscriber units 110 without causing unicast resource allocation for or exchanging unicast messaging with any of the plurality of subscriber units 110.

In some embodiments, the electronic processor 210 determines whether the first subscriber unit 106 has relinquished a push-to-X floor. For example, the PTX server may receive a relinquish message from the first subscriber unit 106. In response to determining that the first subscriber unit 106 has relinquished the push-to-X floor, the push-to-X server 112 tears down the unicast uplink channel (for example, by relinquishing the user's unicast LTE™ GBR on a 3GPP Rx interface). This allows the first subscriber unit 106, when it is finished transmitting PTX data, to return to idle mode in order to be available to receive broadcast PTX communications (for example, by continuing to monitor the broadcast channel for the remainder of the call). In some embodiments, the unicast uplink channel tear down is only be done for a call where the PTX server 112 determines there is broadcast delivery of content in the broadcast location of the given subscriber unit. When the call does not have broadcast delivery, the unicast channel is maintained (for example, so subsequent talk back from others can be delivered over unicast downlink).

Figure 5:
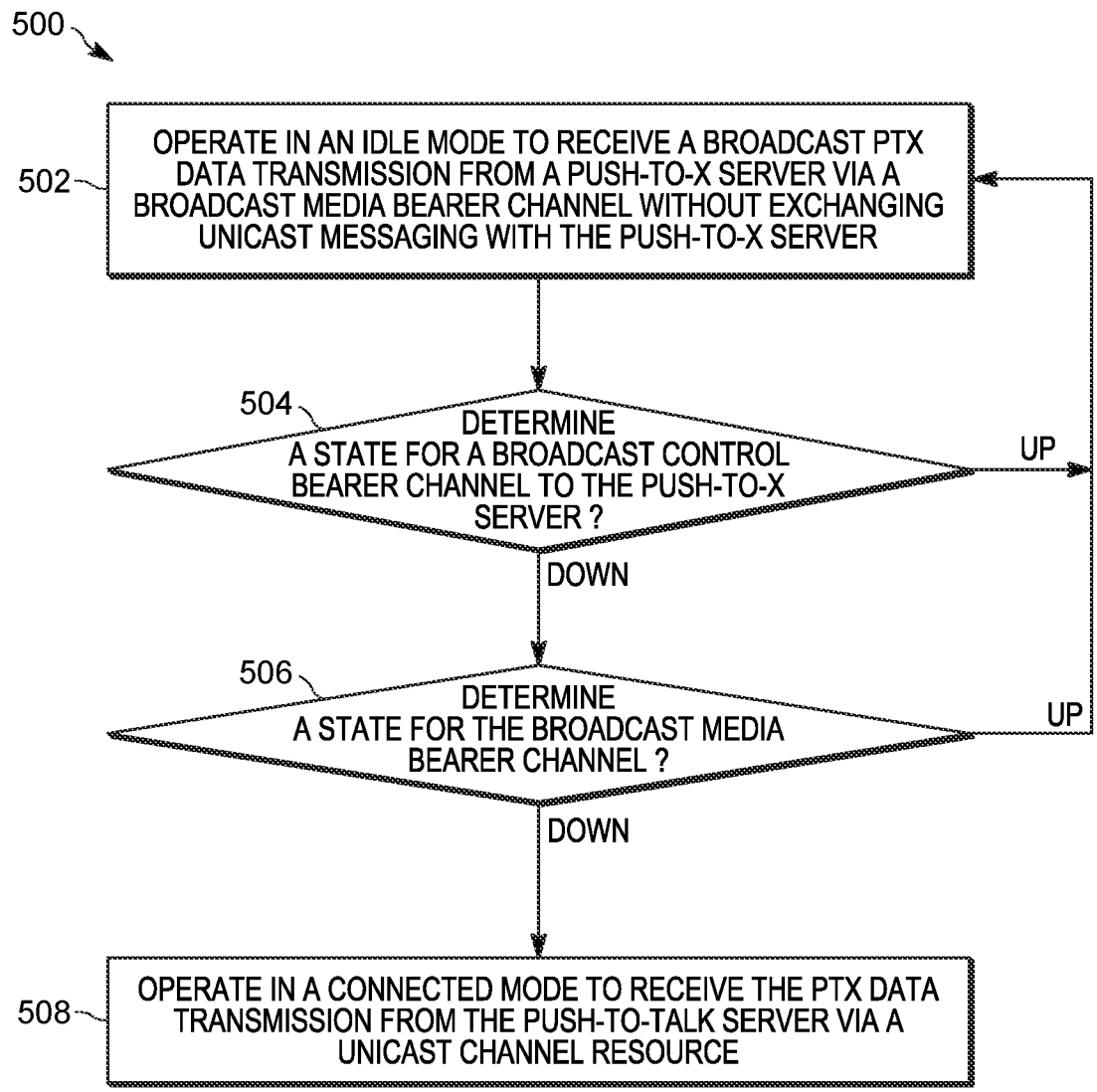
FIG. 5 is a flowchart illustrating a method for operating the subscriber unit of FIG. 3 in accordance with some embodiments.

FIG. 5 illustrates an example method 500 for operating a subscriber unit. Although the method 500 is described in conjunction with the system 100 as described herein, the method 500 could be used with other systems and devices. In addition, the method 500 may be modified or performed differently than the specific example provided.

As an example, the method 500 is described as being performed by the first subscriber unit 106 and, in particular, the electronic processor 305. However, it should be understood that in some embodiments, portions of the method 500 may be performed by other devices, including for example, one or more of the subscriber units 108 and/or 110. Additional electronic processors may also be included in the first subscriber unit 106 that perform all or a portion of the method 500. For ease of description, the method 500 is described in terms of first subscriber unit 106. However, the method 500 may be applied to PTX communications among hundreds or thousands of subscriber units.

At block 502, the first subscriber unit 106 operates in an idle mode (for example, the LTE™ radio resource control idle mode) to receive a broadcast PTX data transmission from the push-to-X server 112 via a broadcast media bearer channel without exchanging unicast messaging with the push-to-X server 112, as described herein.

The first subscriber unit 106, in order to remain in idle mode, must be able to receive broadcast communications. Accordingly, at block 504, the electronic processor 305 determines a state for the broadcast media bearer channel, and at block 506, the electronic processor 305 determines a state for a broadcast control bearer channel to the push-to-X server 112. In some embodiments, the possible states for the channels are up (connected) and down (not connected).

As illustrated in FIG. 5, in response to determining that the state for both the broadcast media bearer channel and the broadcast control bearer channel is up, the first subscriber unit 106 remains in the idle mode (at block 502).

However, in response to determining that the state for either the broadcast media bearer channel or the broadcast control bearer channel is down, the first subscriber unit 106 operates in a connected mode (for example, the LTE™ radio resource control connected mode) to receive the PTX data transmission from the push-to-X server via a unicast channel resource (at block 508), as described herein.

In some embodiments, in response to determining that the state for either the broadcast media bearer channel or the broadcast control bearer channel is down, in addition to operating in the connected mode, the first subscriber unit 106 continues to determine the state for the broadcast media bearer channel and the broadcast control bearer channel. In response to determining that broadcast communications have been restored (that is, the state for both the broadcast media bearer channel and the broadcast control bearer channel is up), the first subscriber unit 106 transmits a control plane message (including a unicast control channel tear down request) to the push-to-X server 112 and returns to the idle mode to receive the broadcast PTX data transmissions over the broadcast media bearer channel. For example, the unicast control channel tear down request may be a control plane message (for example, an LTE™ DETACH request).

In some embodiments, in addition to receiving PTX communications according to the method 500, the first subscriber unit 106 may transmit PTX data to talkgroups. To switch from PTX receive to PTX transmit, the first subscriber unit 106 receives, via a human machine interface (for example, the push-to-talk selection mechanism 350), a push-to-talk request. The push-to-talk request may initiate the transmission of audio or PTX data. In response to receiving the push-to-talk request, the first subscriber unit 106 enters the connected mode to establish a unicast uplink channel to the push-to-X server 112. Once connected, the first subscriber unit 106 transmits, via the unicast uplink channel, a group call request to the push-to-X server 112, and transmits a push-to-X data stream to the push-to-X server 112 via the unicast uplink channel. In order to reduce the use of unicast resources and maintain the ability to receive broadcast PTX communications, as described herein, after completing transmission of the push-to-talk audio stream, the first subscriber unit 106 receives a request to tear down the unicast uplink channel from the push-to-X server 112 (for example, after relinquishing the floor to the server), and returns to the idle mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication device comprising:
a communication interface communicatively coupled to a communication network; and
an electronic processor, coupled to the communication interface, and configured to
operate in an idle mode to receive a broadcast push-to-X data transmission from a push-to-X server via a broadcast media bearer channel without exchanging unicast messaging with the push-to-X server;
determine a state for the broadcast media bearer channel;
determine a state for a broadcast control bearer channel to the push-to-X server;
in response to determining that the state for both the broadcast media bearer channel and the broadcast control bearer channel is up, remain in the idle mode; and
in response to determining that the state for either the broadcast media bearer channel or the broadcast control bearer channel is down;
operate in a connected mode to receive the push-to-X data transmission from the push-to-X server via a unicast channel resource,
determine the state for the broadcast media bearer channel, and
determine the state for the broadcast control bearer channel; and
in response to determining that the state for both the broadcast media bearer channel and the broadcast control bearer channel is up,
transmit a control plane message to the push-to-X server, the control plane message including a unicast control channel tear down request, and
return to the idle mode to receive the push-to-X data transmission over the broadcast media bearer channel.

2. The portable communication device of claim 1, further comprising:
a human machine interface coupled to the electronic processor;
wherein the electronic processor is further configured to:
receive, via the human machine interface, a push-to-talk request;
in response to receiving the push-to-talk request, enter the connected mode to establish a unicast uplink channel to the push-to-X server;
transmit, via the unicast uplink channel, a group call request to the push-to-X server;
transmit a push-to-X data stream to the push-to-X server via the unicast uplink channel; and
after completing transmission of the push-to-X data stream,
receive a request to tear down the unicast uplink channel from the push-to-X server, and
return to the idle mode.

3. The portable communication device of claim 1, wherein the media bearer channel is an evolved multimedia broadcast multicast services media broadcast bearer channel.

4. The portable communication device of claim 1, wherein
the communication network is long term evolution network; and
the unicast channel resource is a long term evolution guaranteed bit rate bearer.

5. The portable communication device of claim 1, wherein
the electronic processor is further configured to control push-to-talk communications according to the 3rd Generation Partnership Project Technical Specification 24.379;
the idle mode is a long term evolution radio resource control idle mode; and
the connected mode is a long term evolution radio resource control connected mode.

6. The portable communication device of claim 1, wherein the electronic processor is configured to operate in a connected mode by transmitting one selected from the group consisting of a control plane message and a user plane message a session initiation protocol refer request.

* * * * *